(12) United States Patent
Pagan

(10) Patent No.: US 7,010,630 B2
(45) Date of Patent: Mar. 7, 2006

(54) COMMUNICATING TO SYSTEM MANAGEMENT IN A DATA PROCESSING SYSTEM

(75) Inventor: William Gabriel Pagan, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 217 days.

(21) Appl. No.: 10/609,774

(22) Filed: Jun. 30, 2003

(65) Prior Publication Data

US 2004/0268013 A1    Dec. 30, 2004

(51) Int. Cl.
G06F 13/00    (2006.01)

(52) U.S. Cl. .............. 710/100; 710/306; 710/313; 710/316

(58) Field of Classification Search ............ 710/10, 710/36, 38, 100, 104, 306, 311, 313, 316; 713/1, 2
See application file for complete search history.

(56) References Cited

U.S. PATENT DOCUMENTS

| | | | |
|---|---|---|---|
| 5,680,403 A | 10/1997 | Riello et al. | |
| 5,752,005 A | 5/1998 | Jones | |
| 5,896,534 A | 4/1999 | Pearce et al. | |
| 6,055,581 A | 4/2000 | Berglund et al. | |
| 6,101,544 A | 8/2000 | Beebe et al. | |
| 6,192,423 B1 | 2/2001 | Graf | |
| 6,295,518 B1 | 9/2001 | McLain et al. | |
| 6,353,857 B1 | 3/2002 | Bader et al. | |
| 6,442,682 B1* | 8/2002 | Pothapragada et al. | 713/1 |
| 2004/0078456 A1* | 4/2004 | Kennedy et al. | 709/223 |
| 2005/0066106 A1* | 3/2005 | Lee | 710/316 |

FOREIGN PATENT DOCUMENTS

JP    2000-298553    10/2000

OTHER PUBLICATIONS

Baseboard Management Controller.*
HP Sytem Board.*

* cited by examiner

*Primary Examiner*—Khanh Dang
(74) *Attorney, Agent, or Firm*—Joseph P. Lally; Martin J. McKinley

(57) ABSTRACT

A data processing system in which standard communication resource facilities are used to enable direct communication to a system management facility. In one implementation, the management adapter shares a communication resource, such as a serial port, with the host system. An arrangement of multiplexers is capable of connecting the local system to the shared resource, the management adapter to the shared resource, or the host system to directly to the management adapter. The host system includes a device driver for the shared resource. The shared resource device driver is leveraged to communicate to the management adapter using a standardized serial protocol (in the case of a shared serial port) when the multiplexers connect the system to the management adapter.

15 Claims, 3 Drawing Sheets

COMMUNICATING TO SYSTEM MANAGEMENT IN A DATA PROCESSING SYSTEM

BACKGROUND

1. Field of the Present Invention

The present invention is related to the field of data processing systems and more particularly to data processing systems employing system management devices.

2. History of Related Art

In the field of microprocessor-based data processing systems, system management generally and remote systems management in particular are increasingly important features for certain applications and environments. In a data center environment, for example, it is common to encounter racks of server machines in a single room. Remote management capability for individual systems greatly simplifies the systems management task. In some server implementations, systems management capability is provided using an adapter inserted into a standard expansion slot of the system. An example of such an adapter is the Remote Supervisor Adapter (RSA) from IBM Corporation. System management resources, including system management adapters (referred to herein as management adapters), provide functionality including graphical console redirection, keyboard and mouse control, server status, independent remote management, remote control of hardware and operating systems, remote update of the server firmware, and continuous health monitoring (fans, thermal monitoring, etc) with time stamped event logs and automated notification and alerts.

While remote supervisor adapters and other similar system management facilities provide highly desirable management control, they also introduce an additional peripheral device into the system. Although much of the management device activity can be achieved independent of the server status, it is nevertheless generally beneficial to enable direct communication between the management adapter and the local system via its operating system or an application running under the operating system. Unfortunately, direct communication to peripheral devices including management adapters and the like requires a dedicated device driver. Moreover, dedicated device drivers are required for each combination of management adapter and operating system. Developing and maintaining device drivers for all of the various implementations of operating systems and system management devices can, therefore, consume significant resources. It would be highly desirable to implement a system that enabled direct communication between a system and its management device. It would be further desirable if the implemented solution leveraged existing software drivers to minimize the effort required to implement and maintain the direct communication functionality.

SUMMARY OF THE INVENTION

The goal identified above is achieved according to the present invention with a data processing system in which standard communication resource facilities are used to enable direct communication to a system management facility. In one implementation, the management adapter shares a communication resource, such as a serial port, with the host system. An arrangement of multiplexers or switches is capable of connecting the local system to the shared resource, the management adapter to the shared resource, or the host system to directly to the management adapter. Because the shared resource is a standard communication device, the operating system will include a device driver for the shared resource.

The shared resource device driver is leveraged to communicate to the management adapter using a standardized serial protocol (in the case of a shared serial port) when the multiplexers connect the system to the management adapter. In one implementation, a first multiplexer determines whether the host system or the management adapter controls the shared resource and a second multiplexer determines whether the shared resource or the host system is connected to the management adapter. When the multiplexers are set appropriately, direct communication between the host system and the management adapter is established using an existing and supported device driver thereby eliminating the need to develop and maintain unique device drivers for the management adapter.

BRIEF DESCRIPTION OF THE DRAWINGS

Other objects and advantages of the invention will become apparent upon reading the following detailed description and upon reference to the accompanying drawings in which.

Figure 1:
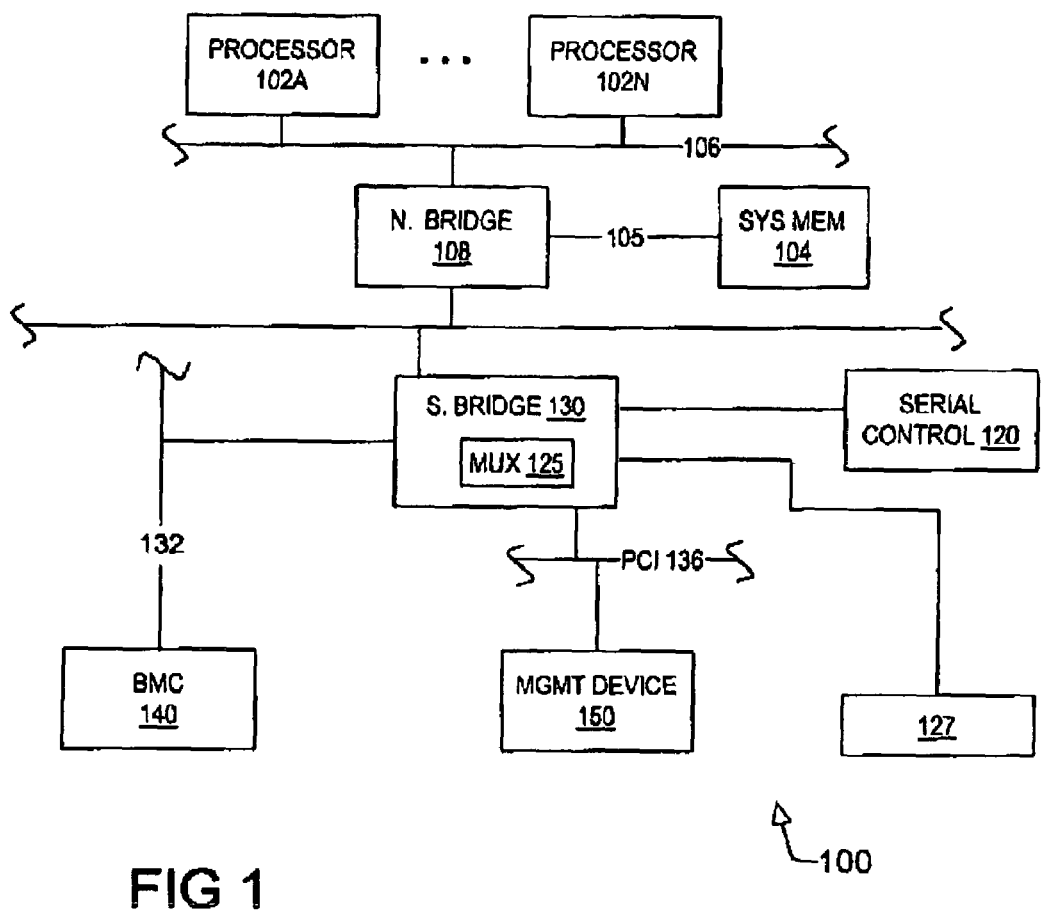
FIG. 1 is a block diagram of selected elements of a data processing system according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a data processing system enabling direct communication between an application running on the system and the system's management adapter by leveraging driver code that enables the system to communicate with a communication resource that is shared with the management adapter. A serial port or other communication resource is connected to a configuration of switches or multiplexers. The multiplexer arrangement can connect the shared resource to the system, the shared resource to the management adapter or the system directly to the management adapter. When the system is connected to the management adapter, direct management adapter communication is achieved using a preexisting protocol and device driver.

Referring now to FIG. 1, a block diagram of selected elements of a data processiug system 100 according to one embodiment of the invention is presented. In the depicted embodiment, system 100 includes a set of microprocessors 102A through 102N (generically or collectively referred to herein as processor(s) 102) each connected to a processor bus 106 where the number of processors in the set may vary from 1 to 4 (or more). In the depicted embodiment, exemplary of a symmetric multiprocessor (SMP) system, each ofthe processors 102 is connected to a shared system memory 104 through a bridge (north bridge) 108 and a memory bus 105 connected thereto. Although the depicted embodiment illustrates an SMP configuration, the invention is equally suitable for and applicable to other configurations including uniprocessor systems, distributed shared memory systems, and so forth.

In the depicted embodiment, north bridge 108 is connected to a south bridge 130. South bridge 130 connects multiple I/O busses to processor bus 106 and processors 102. I/O busses enable peripheral devices to communicate with processors 102 and system memory 104 through bridges 130 and 108. The various busses to which south bridge 130 connects include an I2C bus 132, a Low Pin Count (LPC) bus 134, and a PCI bus 136, all as will be familiar to those in the field of microprocessor based data processing systems.

For purposes of the depicted implementation of the present invention, the significant peripheral devices include a serial port controller 120 and an adapter-implemented management device 150 identified as a Remote Supervisor Adapter (RSA). Although this particular implementation leverages the code for the system serial port, it will be appreciated that other embodiments could equally well utilize virtually any other standard communication resource. The ubiquitous presence of serial ports in data processing systems does, however, make them a likely candidate as a communication resource around which the direct system to management adapter communication is based. Serial port controller 120 enables the local host to communicate externally via a serial protocol exemplified by, e.g., the RS-232 or RS-485 communication protocols. Management device 150, as implemented in FIG. 2, is a PCI or other suitable adapter card that provides extended management functionality to the system.

Also shown in FIG. 1 is a baseboard management controller (BMC) 140 connected to I2C bus 132. BMC 140 provides certain basic system management functionality including, for example, autonomous polling of system health status. In the context of the present invention, BMC 140 is used in conjunction with the shared communication resource to control access to the shared resource. More specifically, BMC 140 is configured in the depicted embodiment of system 100 to control multiplexing circuitry 125 that determines the connections between serial port controller 120, management device 150, and the serial port connector 127. In other embodiments, management device 150 may also be able to control multiplexing circuitry 125.

Figure 2:
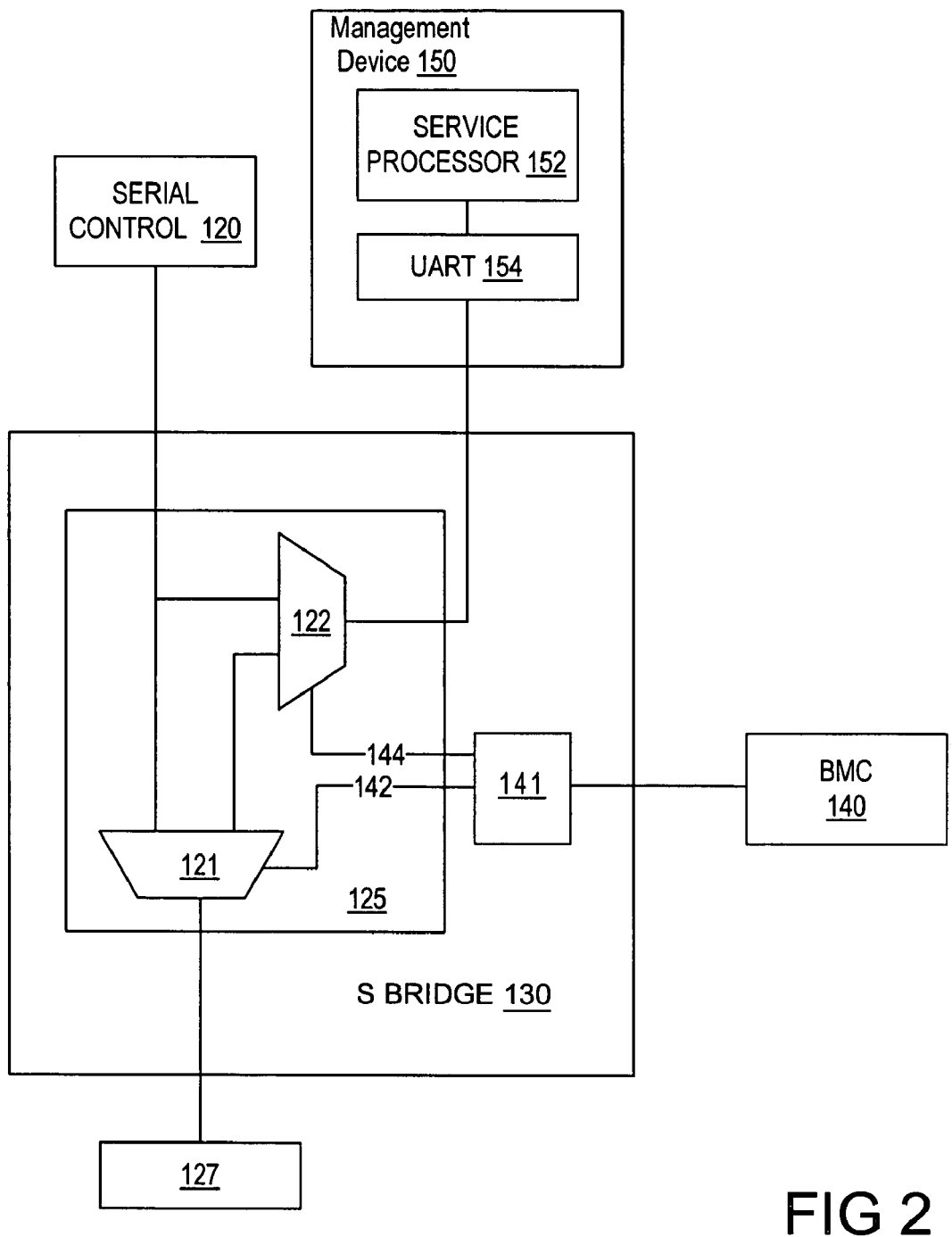
FIG. 2 is a block diagram of selected elements of the system of FIG. 1 emphasizing details of a shared communication resource according to one embodiment of the invention.

Referring to FIG. 2, an embodiment of selected elements of data processing system 100 according to one embodiment of the present invention is shown to emphasize aspects of the hardware controlled shared communication resource. As depicted in FIG. 2, multiplexer circuit 125 includes at least two multiplexers. A first multiplexer 121 is configured to select between the serial port controller 120 and the management device 150 as the master of serial port connector 127. A second multiplexer 122 connects management device 150 to either serial port controller 120 or the serial port connector 127. BMC 140, via I2C bus 132, sets at least a portion of the configuration via the control signals 142 and 144 for first and second multiplexers 121 and 122 respectively. In this illustration, the orientation of the multiplexers should not be construed as implying a direction associated with the corresponding signals. Communication can occur, for example, from management device 150 to serial port connector 127 through multiplexer 122.

In another embodiment, the serial port that is shared between the management device 150 and the system is integrated into management device 150. In this embodiment, the multiplexers and corresponding control signals may be integrated into the management device as well. In still other embodiments, the multiplexers may be controlled by an element other than BMC 140 such as, e.g., South Bridge 130.

Management device 150 as shown in FIG. 2 includes a service processor 152 and an associated UART 154, which may be integrated within the service processor. In this embodiment, management device 150 transmits and receives serial data with multiplexer 122. Similarly, serial controller 120 includes a UART (not depicted) so that the format of data coming from serial controller 120 and from management device 150 is the same. In another possible implementation, a UART may be embedded within serial port connector 127 such that the data within multiplexing circuitry 125 is in a parallel format. The critical consideration for purposes of the present invention is that the format of data exchanged between serial controller 120 and management device 150 during direct communication is the same format as the information exchanged between management device 150 and serial port connector 127 when the management adapter is master of the serial port.

Using multiplexer circuitry 125, system 100 according to the present invention is able to provide a direct communication link between the system serial controller 120 and management device 150. Moreover, this communication link is fully supported by existing, well developed, and standardized device driver code. Management device 150 and serial port controller 120 are both capable of communicating information in a format suitable for external transmission via serial port connector 127. The invention beneficially takes advantage of this common capability to permit a local system to communicate with its system management device without invoking an adapter specific device driver. It another embodiment, a similar mechanism can be used to permit a local system to communicate with BMC 140.

Figure 3:
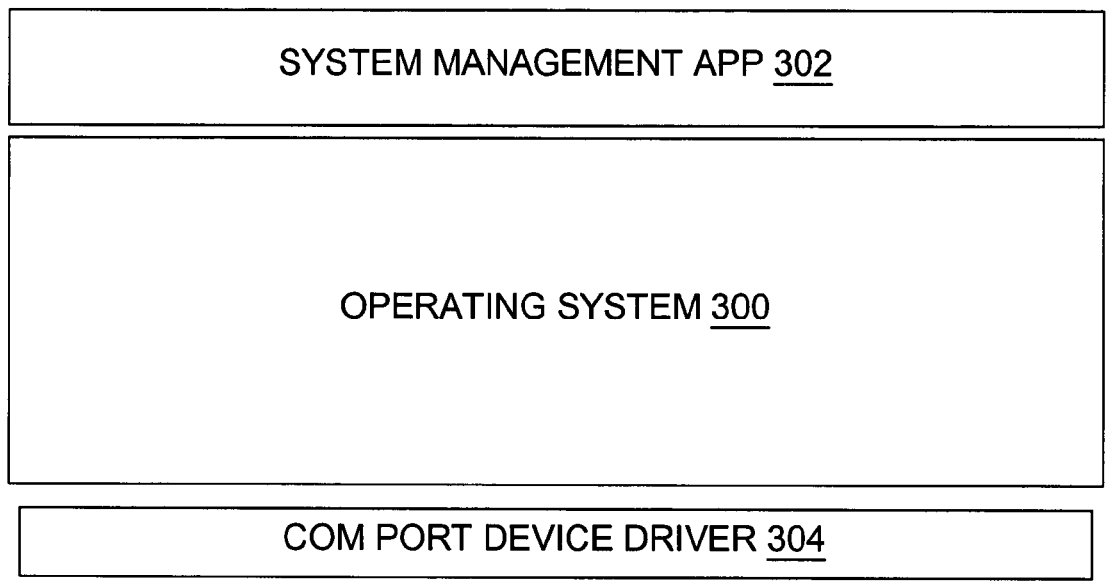
FIG. 3 is a conceptual block diagram of software elements of the data processing system of FIG. 1.

Referring to FIG. 3, a conceptual illustration of selected software elements used in the system 100 is presented to emphasize the use of a standard device driver as a link between the system and one of its peripheral devices. As depicted in FIG. 3, the significant software elements of system 100 include an operating system 300, a system management application 302, and a serial port device driver 304. Serial port device driver 304, although shown as a distinct element or piece of code, is provided as a part of operating system 300 to enable applications to communicate with external devices via serial port connector 127.

The system management code 302 is application level code that provides access to the management functionality of management device 150. This application level code requires a device driver to communicate with management device 150. In a conventional implementation, an adapter specific device driver would be necessary to enable the required communication. In the present invention, however, the application code 302 talks to management device 150 by invoking serial port device driver 304 to send information to the management adapter in a supported format. Initially, the multiplexing circuitry 125 shown in FIG. 2 is configured to connect serial controller 120 to the management device 150. In one implementation, configuring circuitry 125 is achieved by setting the multiplexers 121 and 122 to one state during a pre-boot portion of a boot sequence and to another state when the operating system is booted. Another method of configuring circuitry 125 would require a user to communicate to the management device remotely before proceeding (possibly through a LAN interface, etc.). Other implementations may configure the multiplexers differently depending upon the implementation.

Management device 150 should be able to both send and receive serial protocol data. Beneficially absent from the software elements shown in FIG. 3 is a dedicated management adapter device driver. By employing a modest amount of additional multiplexing hardware, the invention is able to eliminate the need for a dedicated device driver thereby greatly simplifying the system management support requirements.

It will be apparent to those skilled in the art having the benefit of this disclosure that the present invention contemplates a mechanism for enabling a system to communicate with its management adapter via standard device drivers provided by the OS. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system, comprising:
   at lean one processor;
   a communication port controller, connected to the processor via at least one peripheral bus;
   a system management device accessible to the processor, wherein the system management device and the communication port controller share access to a communication port;
   device driver means for the communication port; and
   multiplexing circuitry enabled to connect the communication port controller to the system management device enabling the processor to communicate with the system management device by communicating to the communication port controller using the communication port device driver means;
   wherein the multiplexing circuitry is further enabled to connect the system management device to the communication port.

2. The system of claim 1, wherein the system is configured to employ the multiplexing circuitry to connect the system management device to the shared communication device during at least a portion of a boot sequence and further configured to connect the shared communication device when an operating system is loaded.

3. The system of claim 1, wherein the communication port is a serial port.

4. The system of claim 1, wherein the system management device is further characterized as a system management adapter connected to a PCI bus of the system.

5. The data processing system of claim 1, further comprising a second controller, connected to an I2C bus, for controlling the multiplexing circuitry.

6. A data processing system, comprising:
   a processor;
   a communication port accessible to the processor and suitable for communicating data with an external device, the communication port being supported by a communication port device driver; a system management device coupled to the processor;
   a communication port controller coupled to the processor;
   controllable means for allocating the communication port to either the system management device or to the communication port controller; and
   wherein the means for allocating the communication port are further configured for connecting the communication port controller to the system management device enabling the processor to communicate to the system management device by communicating to the communication port controller using the communication port device driver;
   wherein the controllable means comprises multiplexing circuitry enabled to connect the communication port to the communication port controller, and the system management device to the communication port, the multiplexing circuitry is further enabled to connect the system management device to the communication port controller.

7. The system of claim 6, wherein the communication port comprises a serial port.

8. The system of claim 6, wherein the communication port is connected to the communication port controller upon booting the operating system.

9. The system of claim 6, wherein the system management device is further characterized as a system management adapter connected to a PCI bus of the system.

10. The data processing system of claim 6, wherein the controllable means include a second controller, accessible via an I2C bus of the data processing system, connected to the multiplexing circuitry.

11. An I/O assembly for use in a data processing system comprising:
    a processor;
    a communication port controller accessible to the processor connected to at least one peripheral bus;
    a system management device accessible to the processor, wherein the system management device and the communication port controller share access to a communication port;
    device driver means for the communication port; and
    multiplexing circuitry enabled to connect the communication device controller to the system management device enabling the processor to communicate with the system management device by communicating to the communication device controller using the device driver means;
    wherein the multiplexing circuitry is further enabled to connect the communication port controller and the system management device to the communication port.

12. The assembly of claim 11, wherein the system is configured to employ the multiplexing circuitry to connect the system management device to the communication port during at least a portion of a boot sequence.

13. The assembly of claim 11, wherein the shared communication device is a baseboard serial port.

14. The assembly of claim 11, wherein the system management device is further characterized as a system management adapter connected to an I/O bus of the system.

15. The I/O assembly of claim 11, further comprising a second controller, coupled to an I2C bus, for controlling the multiplexing circuitry.

\* \* \* \* \*

UNITED STATES PATENT AND TRADEMARK OFFICE
CERTIFICATE OF CORRECTION

PATENT NO. : 7,010,630 B2
APPLICATION NO. : 10/609774
DATED : March 7, 2006
INVENTOR(S) : William Gabriel Pagan It is certified that error appears in the above-identified patent and that said Letters Patent is hereby corrected as shown below:

Claim 1, line 2, delete "lean" and insert --least--

Claim 6, lines 19-25, delete "wherein the controllable means comprises multiplexing circuitry enabled to connect the communication port to the communication port controller, and the system management device to the communication port, the multiplexing circuitry is further enabled to connect the system management device to the communication port controller" and insert --wherein the controllable means comprises multiplexing circuitry enabled to connect the communication port to the communication port controller, the system management device to the communication port, or the system management device to the communication port controller--

Claim 11, lines 11-12, delete "communication device controller" and insert --communication port controller--

Claim 11, line 18, delete "and" and insert --or--

Claim 13, lines 1-2, delete "wherein the shared communication device is a baseboard serial port" and insert --wherein the communication port is a serial port--

Claim 14, line 3, delete "an I/O bus" and insert --a PCI bus--

Signed and Sealed this

Second Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,010,630 B2  Page 1 of 1
APPLICATION NO. : 10/609774
DATED : March 7, 2006
INVENTOR(S) : William Gabriel Pagan It is certified that error appears in the above-identified patent and that said Letters Patent is hereby corrected as shown below:

Column 5, Claim 1, line 28, delete "lean" and insert --least--

Column 6, Claim 6, lines 12-18, delete "wherein the controllable means comprises multiplexing circuitry enabled to connect the communication port to the communication port controller, and the system management device to the communication port, the multiplexing circuitry is further enabled to connect the system management device to the communication port controller" and insert --wherein the controllable means comprises multiplexing circuitry enabled to connect the communication port to the communication port controller, the system management device to the communication port, or the system management device to the communication port controller--

Column 6, Claim 11, lines 42-43, delete "communication device controller" and insert --communication port controller--

Column 6, Claim 11, line 50, delete "and" and insert --or--

Column 6, Claim 13, lines 56-57, delete "wherein the shared communication device is a baseboard serial port" and insert --wherein the communication port is a serial port--

Column 6, Claim 14, line 60, delete "an I/O bus" and insert --a PCI bus--

This certificate supersedes the Certificate of Correction issued June 2, 2009.

Signed and Sealed this

Twenty-third Day of June, 2009

JOHN DOLL
*Acting Director of the United States Patent and Trademark Office*